United States Patent [19]

Oshita

[11] Patent Number: 4,681,183

[45] Date of Patent: Jul. 21, 1987

[54] ELECTRICALLY OPERATED POWER STEERING DEVICE

[75] Inventor: Saiichiro Oshita, Ohta, Japan

[73] Assignee: Fuji Jukogyo Kabushiki Kaisha, Tokyo, Japan

[21] Appl. No.: 783,902

[22] Filed: Oct. 3, 1985

[30] Foreign Application Priority Data

Oct. 8, 1984 [JP] Japan ................................ 59-212279

[51] Int. Cl.$^4$ ............................................. B62D 5/04
[52] U.S. Cl. .................................... 180/79.1; 180/142; 180/148
[58] Field of Search ............... 180/79.1, 132, 141, 180/142, 148

[56] References Cited

U.S. PATENT DOCUMENTS 4,410,193 10/1983 Howard ............................... 180/132
4,415,054 11/1983 Drotchas ............................ 180/79.1
4,556,116 12/1985 O'Neil ................................ 180/79.1

*Primary Examiner*—John J. Love
*Assistant Examiner*—Donn McGiehan
*Attorney, Agent, or Firm*—Martin A. Farber

[57] ABSTRACT

An electrically operated power steering device which is fitted to the steering system of a vehicle to provide supplementary steering power by means of an electric motor, wherein the electrically operated power steering device controls the motor current by the signal corresponding to the torsional torque in the steering system and the single corresponding to the restoring torque in accordance with the angular displacement of the wheel, so that the restoring force takes effect immediately to restore the steering wheel when the input torque on the steering wheel is reduced.

4 Claims, 5 Drawing Figures

ELECTRICALLY OPERATED POWER STEERING DEVICE

BACKGROUND OF THE INVENTION

The present invention relates to an electrically operated power steering device which is fitted to the steering system of a road vehicle to provide supplementary steering power by means of an electric motor in general and, particularly to such a device with improved restoration characteristics on completion of a turn in either direction.

Electrically operated power steering devices generally provide supplementary steering power (assistance) by measuring the torsional torque applied when the steering wheel is operated, to drive an electric motor according to this torsional torque, the output torque of the electric motor being applied to the rack shaft in the case of a rack-pinion type steering gear. Such electrically operated systems require the motor to be driven only while steering, thus eliminating loss in of engine power incurred in maintaining a continuous flow of hydraulic fluid, such as required in hydraulically operated systems. Also, as the direction and magnitude of assistance is determined by the polarity and magnitude of motor current, control including corrections for vehicle speed can be made with relative ease. Further, although restoration characteristics tend to deteriorate in power steering systems due to increase in friction in the system, electrically operated systems have the advantage in that countermeasures can be taken more easily than with hydraulically operated systems.

With electrically operated systems however, the restoration characteristics and the "feel" of steering tend to suffer due to friction in the reduction gears, since the motor is connected to the rack shaft through reduction gears. Also, due to the increase in the amount of inertia of the motor, convergence in a hands-off condition at high speeds tends to be impaired.

An electrically operated power steering device intended for remedying such shortcomings has been described in, for example, the Japanese publication of examined patent application (JB, B1) No. 46-5168 (1971). In this prior art example, it has been proposed to drive the motor in the restoring direction subject to the output of a discriminator which detects such a condition where no input torque is applied on the steering wheel while the wheel is in any position other than neutral. However, this system works only when the input torque on the steering wheel is nil, and it also fails to provide adequate response, as the discriminator sends the output signal only after detecting that the above conditions have been met.

SUMMARY OF THE INVENTION

The object of the present invention is to provide an electrically operated power steering device, in which the restoring force corresponding to the angular displacement of the wheel (steering angle) is combined with the assistance corresponding to the torsional torque in the steering system, to control the motor current, so that the restoring force would take effect immediately when the input torque on the steering wheel is reduced.

With the above and other objects and advantages in view, the present invention will become more clearly understood in connection with the detailed description of a preferred embodiment, when considered with the accompanying drawings, of which:

DETAILED DESCRIPTION OF THE PREFERRED EMBODIMENT

An embodiment of the present invention shall now be described in detail below, by making reference to the attached drawings.

Figure 1:
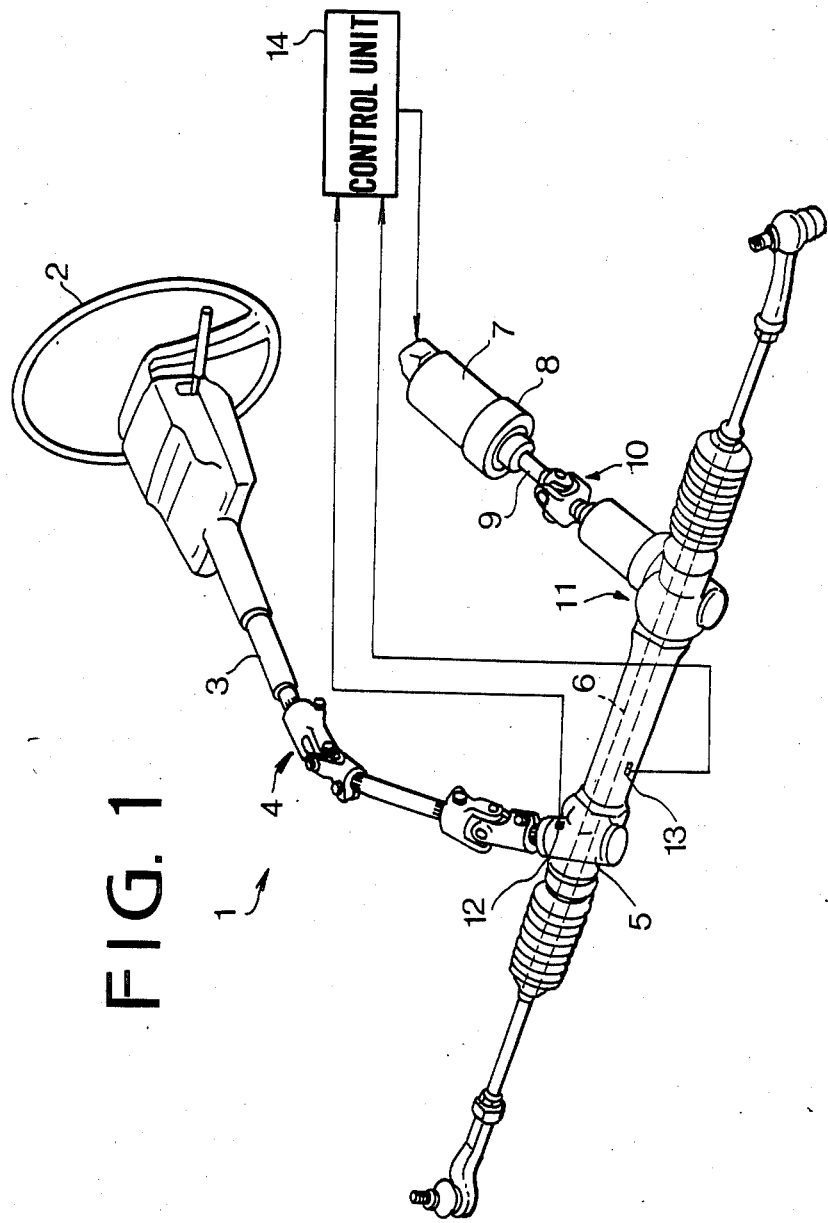
FIG. 1 is a perspective view showing the outline of the device according to the present invention.

In FIG. 1, which shows the outline of the invention, a rack-pinion type steering gear is indicated by the reference number 1. A shaft 3 on a steering wheel 2 is connected to a pinion shaft within a gear box 5 through joints 4, and a transversely slidable rack shaft 6 is located within the gear box 5. Another rack-pinion mechanism 11 engaging the rack shaft 6 is located in the box 5, an output shaft 9 from a reduction gear 8 on the electric motor 7 being connected to the pinion shaft of the rack-pinion mechanism 11 through joint 10, to constitute an electrically operated power steering device.

A torsional torque sensor 12 is attached to the side of steering shaft 3 of gear box 5, to measure the torsional torque by its torsional deflection, and a steering angle sensor 13 is attached to the rack side of gear box 5, to measure the steering angle by the displacement of the rack shaft. Both sensors 12, 13 form a circuit with the electric motor 7 through a control unit 14.

Figure 2:
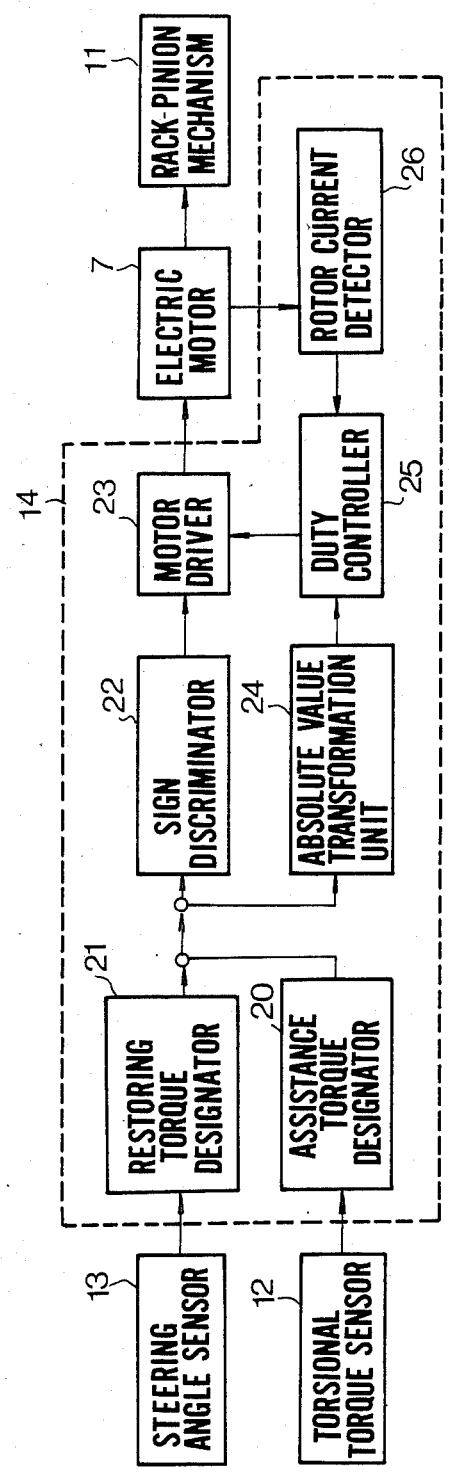
FIG. 2 is a block diagram showing the components of the control unit.
Figure 3:
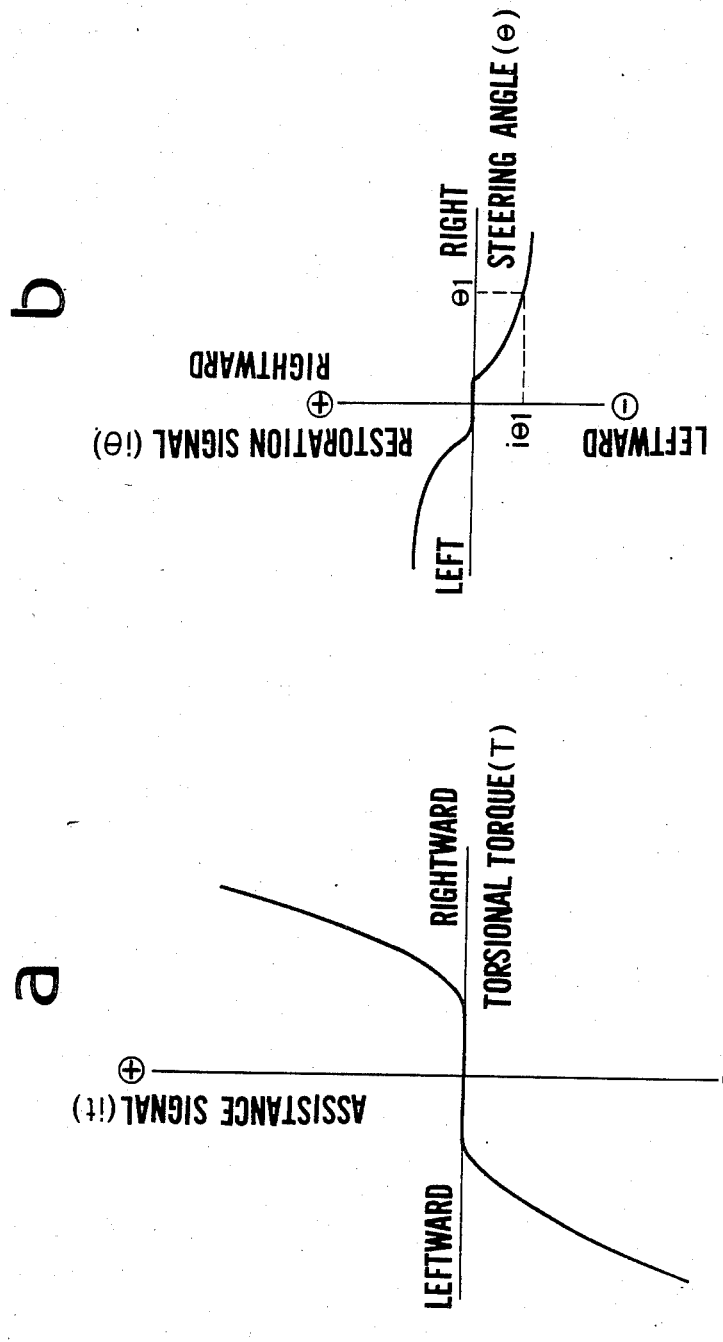
FIG. 3($a$) and 3($b$) show the characteristics of the assistance and restoration signals.

In FIG. 2, the construction of the control unit 14 is shown. The signal from the torsional torque sensor 12 is fed to assistance torque designator 20 to produce an assistance signal, while the signal from the steering angle sensor 13 is fed to a restoring torque designator 21 to produce a restoration signal. The assistance torque designator 20 increases the absolute value of assistance signal iT exponentially in the positive rightward direction in response to a torsional torque resulting from a rightward steering input, as shown in FIG. 3($a$), and in response to a torsional torque from a leftward steering input, increases the absolute value the assistance signal similarly but in the negative leftward direction, to produce an assistance signal iT of positive or negative value, corresponding to the direction of steering input and the torsional torque applied. The restoring torque designator 21, as shown in FIG. 3($b$), increases the absolute value of restoration signal $i\theta$ in negative (leftward) direction in response to a rightward angular displacement the wheel from neutral position when turning right, and similarly increases the absolute value of restoration signal $i\theta$ but in positive (rightward) direction, when turning left, to produce a restoration signal $i\theta$ of positive or negative value, corresponding to the direction and magnitude of the steering angle.

Hence, if a rightward steering angle exists while a rightward steering torque is being applied, the assistance signal iT and the restoration signal $i\theta$ would have opposite signs, and the sum of both would change signs from positive to negative and vice versa, with a threshold condition where $iT + i\theta = 0$.

The sign of the sum of above signals iT and iθ is determined by the sign discriminator 22, to switch the polarity of motor current so that an output in the positive direction is developed when the sum is positive, and an output in the negative direction is developed when the sum is negative. The sum of the signals is also fed to the absolute value transformation unit 24 to determine its magnitude, which in turn is feed to a duty controller 25 to determine the duty ratio, which is sent to the driver 23. Here, the duty ratio is determined so that the motor current watches the designated value, by measuring the motor current with the detector 26, and feeding the value of current measured by the detector 26 back to the duty controller 25.

The operation of such a device shall now be described, taking the case of a rightward turn, and by referring to FIG. 4. In the beginning, when the steering wheel 2 is turned from a previous neutral condition, there would exist no restoration signal originating from the steering angle sensor 13. Only the torsional torque T developed in the steering system is detected by the torque sensor 12, to cause the assistance torque designator 20 to send out a positive assistance signal iT according to the characteristic shown in FIG. 3(a). The assistance signal in turn is fed to the driver 23 through the sign discriminator 22 and through the absolute value transformation unit 24 and duty ratio controller 25, so that the electric motor 7 would develop a rightward steering torque corresponding to the electric current i in positive direction, according to the torque characteristic curve $m_1$ shown in FIG. 4. Thus, an assisting force is applied to the rack shaft 6 through the rack-pinion mechanism 11 connected to the electric motor, to reduce the input steering force required at the steering wheel 2.

As the wheel begins to turn rightward under the power assistance, the angular deflection of the wheel is detected by the steering angle sensor 13, which causes a restoration signal iθ with characteristic as shown in FIG. 3(b) to be sent out from the restoring torque designator 21. Hence, when the wheel is turned to the right, the electric motor 7 is controlled according to the designated current i, which is the sum of iT and iθ. For example, under a rightward steering angle $θ_1$, the electric motor 7 would be controlled by the characteristic $m_2$ shown by the broken line in FIG. 4, which is obtained by adding a negative restoration signal $iθ_1$ to the assistance signal iT. If the rightward steering angle $θ_1$ is maintained, while a torsional torque $T_1$ is being applied, a rightward assisting force would occur, under designated current $i_1$.

If now, the rightward steering input is removed, the designated current i would decrease along the characteristic curve $m_2$, as the torsional torque would diminish rapidly, and become negative (leftward). Hence, a leftward restoring torque is generated by the electric motor 7, which is sufficient to overcome friction in the reduction gears and moment of inertia of the motor, so that the wheel would return to neutral position smoothly under caster effect when the vehicle is in motion. As the restoration proceeds, and the steering angle decreases, the characteristic curve $m_2$ for the designated current i would gradually shift towards curve $m_1$ shown in FIG. 4, the restoring force becoming zero by the time when the wheel returns to neutral position. Hence, the convergence in hands-off condition at high speeds would be improved.

Figure 4:
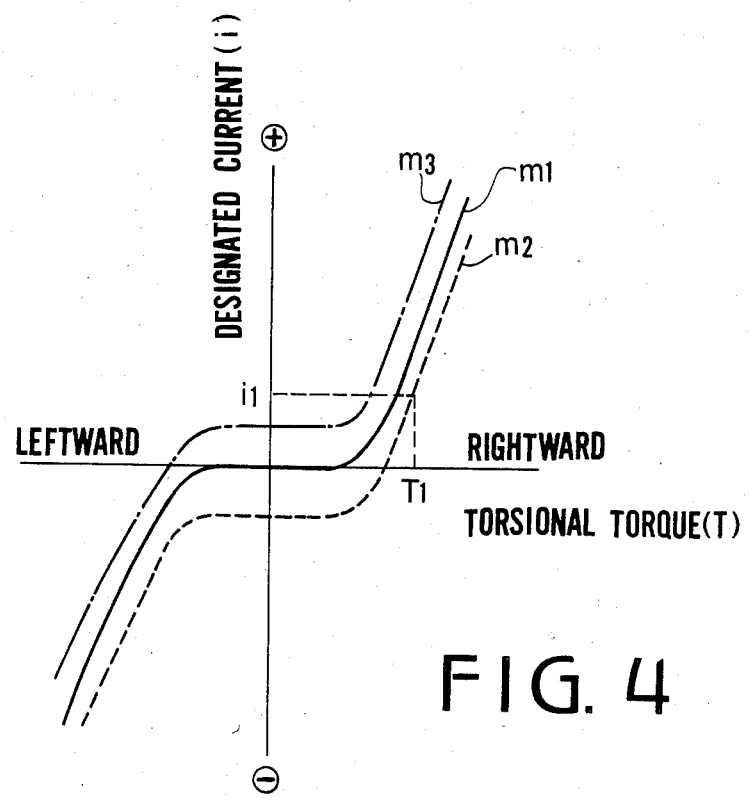
FIG. 4 is a diagram explaining the operation of device according to the present invention.

In the case of a leftward steering input, except for the motor rotating in the opposite direction according to characteristic curve $m_3$ shown in FIG. 4, the operation is identical.

Although explanation has been made taking a rack-pinion type steering gear as an example, it should be understood that the present invention is equally applicable to other types of steering gears as well, and that the characteristics of the designators 20 and 21 are not restricted to those described above.

With the electrically operated power steering device of the present invention, the motor control system is simplified, since the assistance signal based on the torsional torque sensor and the restoration signal based on the steering angle sensor are added, to control the motor under a single control system. Also, as the restoration force takes effect immediately on completion of a turn, stability is improved, as well as the convergence in the hands-off condition.

What is claimed is:

1. An electrically operated power steering device for a vehicle having a steering wheel, comprising
   a first pinion operatively connected to said steering wheel,
   a second pinion,
   an electric motor operatively connected to said second pinion,
   a rack shaft engaging with said first and second pinions, the rack shaft being moved by rotation of the steering wheel and the electric motor and operatively connected to wheels of the vehicle so as to steer the vehicle wheels,
   torsional torque sensor means adjacent the first pinion for measuring torsional torque thereof,
   steering angle sensor adjacent the rack shaft for measuring angular displacement of the vehicle wheels, and
   means for controlling the electric motor in dependency on said torsional torque and on said angular displacement, and wherein
   said means for controlling comprises
   an assistance torque designator providing an assistance signal in dependency on the torsional torque,
   a restoring torque designator providing a restoration signal in dependency on said angular displacement,
   means for adding said signals together, and
   means for driving the electric motor by discrimination of the sign of the sum of said signals and by duty ratio control dependent on the absolute value of the sum of said signals under feedback control.

2. The device according to claim 1, wherein
   said assistance signal increases in absolute value exponentially with increasing measured torque, and
   said restoration signal increases in absolute value with respect to the measured angular displacement but the sign of said restoration signal is opposite to the sign of said assistance signal when steering in one direction away from a neutral postion of the wheels and the angular displacement is in the same one direction.

3. The device according to claim 2, wherein
   the absolute value of said restoration signal approaches a fixed value as the measured angular displacement increases.

4. An electrically operated power steering device for a vehicle having a steering wheel, comprising
   a first means operatively connected to said steering wheel, a second means, an electric motor operatively connected to said second means, a member engaging with said first and second means, the member being operated by rotation of the steering wheel and the electric motor and operatively connected to wheels of the vehicle so as to steer the vehicle wheels, torsional torque sensor means for measuring torsional torque applied by a driver to the steering wheel, steering angle sensor means for measuring angular displacement of the vehicle wheels, means for controlling the electric motor in dependency on said torsional torque and on said angular displacement, comprising an assistance torque designator providing an assistance signal in dependency on the torsional torque, a restoring torque designator providing a restoring signal in dependency on said angular displacement, means for adding said signals together, and means for driving the electric motor by discrimination of the sign of the sum of said signals and by duty ration control dependent on the absolute value of the sum of said signals under feedback control.

* * * * *